United States Patent
Zou et al.

(10) Patent No.: US 9,326,203 B2
(45) Date of Patent: Apr. 26, 2016

(54) METHOD AND CORRESPONDING APPARATUS FOR COORDINATING EXECUTIONS OF INTRA-RADIO HANDOVER

(75) Inventors: Wei Zou, Shanghai (CN); Zhenhong Li, Shanghai (CN); Haifeng Wang, Shanghai (CN); Gang Wu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 172 days.

(21) Appl. No.: 13/518,381

(22) PCT Filed: Dec. 24, 2009

(86) PCT No.: PCT/CN2009/075967
§ 371 (c)(1),
(2), (4) Date: Jun. 21, 2012

(87) PCT Pub. No.: WO2011/075897
PCT Pub. Date: Jun. 30, 2011

(65) Prior Publication Data
US 2012/0264434 A1    Oct. 18, 2012

(51) Int. Cl.
*H04W 36/00* (2009.01)
*H04W 36/14* (2009.01)
*H04W 36/18* (2009.01)
*H04W 36/36* (2009.01)
*H04W 88/06* (2009.01)

(52) U.S. Cl.
CPC .............. *H04W 36/14* (2013.01); *H04W 36/18* (2013.01); *H04W 36/36* (2013.01); *H04W 88/06* (2013.01)

(58) Field of Classification Search
CPC .................... H04W 36/0005; H04W 36/0016; H04W 36/0077; H04W 36/0088; H04W 36/0094; H04W 36/14; H04W 36/34; H04W 36/36

See application file for complete search history.

(56) References Cited

U.S. PATENT DOCUMENTS

| 7,215,962 | B2 | 5/2007 | Faerber | |
| 8,145,218 | B2* | 3/2012 | Hyziak | H04W 36/30 455/429 |
| 8,804,660 | B2* | 8/2014 | Liao | H04W 36/0055 370/331 |
| 2003/0103479 | A1* | 6/2003 | Anderson et al. | 370/335 |
| 2004/0121777 | A1* | 6/2004 | Schwarz et al. | 455/452.1 |

(Continued)

FOREIGN PATENT DOCUMENTS

| EP | 0736983 B1 | 10/2002 |
| EP | 1971164 A1 | 9/2008 |

(Continued)

OTHER PUBLICATIONS

U.S. Appl. No. 12/459,571, "Data Packet Communications in a Multi-Radio Access Environment", filed Jul. 2, 2009, 19 pages.

(Continued)

*Primary Examiner* — Dai A Phuong
(74) *Attorney, Agent, or Firm* — Mintz Levin Cohn Ferris Glovsky and Popeo, P.C.

(57) ABSTRACT

The present invention proposes a method and corresponding apparatus for coordinating the executions of intra-radio handover, wherein the method comprising determining an intra-radio handover is to be executed on a communication device; and coordinating the execution of the intra-radio handover to determine whether to postpone the execution of the intra-radio handover, so that there is at least one active radio on the communication device.

20 Claims, 12 Drawing Sheets

(56) References Cited

U.S. PATENT DOCUMENTS

| | | | | |
|---|---|---|---|---|
| 2004/0246917 | A1* | 12/2004 | Cheng | H04W 36/02 370/328 |
| 2005/0181794 | A1* | 8/2005 | Rajkotia | 455/436 |
| 2007/0160007 | A1* | 7/2007 | Wang et al. | 370/331 |
| 2007/0268858 | A1* | 11/2007 | Soto | 370/328 |
| 2007/0293224 | A1* | 12/2007 | Wang et al. | 455/436 |
| 2008/0130585 | A1* | 6/2008 | Park et al. | 370/332 |
| 2009/0088075 | A1* | 4/2009 | Orlassino | H04W 36/18 455/41.2 |
| 2009/0239541 | A1* | 9/2009 | Kodama et al. | 455/438 |
| 2009/0258607 | A1* | 10/2009 | Beninghaus | H04B 1/3805 455/77 |
| 2010/0165950 | A1* | 7/2010 | Abeta et al. | 370/332 |
| 2010/0189074 | A1* | 7/2010 | Liao | H04W 36/0055 370/331 |
| 2010/0304737 | A1* | 12/2010 | Jain et al. | 455/426.1 |
| 2011/0075633 | A1* | 3/2011 | Johansson | H04W 36/02 370/331 |

FOREIGN PATENT DOCUMENTS

| | | |
|---|---|---|
| EP | 1971164 A1 | 9/2008 |
| EP | 2036386 A1 | 3/2009 |
| EP | 1873928 B1 | 5/2009 |
| GB | 2289191 A | 11/1995 |
| GB | 2429877 A | 3/2007 |
| WO | WO-2006084952 A1 | 8/2006 |
| WO | 2008/000914 A1 | 1/2008 |
| WO | 2008/080422 A1 | 7/2008 |

OTHER PUBLICATIONS

Miozzo et al., "Architectures for Seamless Handover Support in Heterogeneous Wireless Networks", IEEE Wireless Communications and Networking Conference, Mar. 31-Apr. 3, 2008, pp. 2432-2437.

Ahmed et al., "Architecture of a Context-Aware Vertical Handover Decision Model and its Performance Analysis for GPRS-WiFi Handover", Proceedings of 11th IEEE Symposium on Computers and Communications, Jun. 26-29, 2006, pp. 795-801.

Yaver et al., "Utilization of Multi-Radio Access Networks for Video Streaming Services", IEEE Wireless Communications and Networking Conference, Apr. 5-8, 2009, 6 Pages.

Berggren et al., "Multi-Radio Resource Management for Ambient Networks", IEEE 16th International Personal, Indoor and Mobile Radio Communications, vol. 2, Sep. 11-14, 2005, 5 pages.

Park et al., "Improvement of Handover Break Time Performance for Wireless Broadband Access System", Networking and Communications, Oct. 2007, 5 pages, May 2, 2014.

"Mobile VoIP: Has the Time Come?", Mobile VoIP, Retrieved on Jun. 14, 2013, Webpage available at: http://www.idate.org/en/News/Mobile-VoIP_592.html.

Sachs et al., "Assessment of the Access Selection Gain in Multi-Radio Access Networks", European Transactions on Telecommunications, vol. 20, Issue 3, Nov. 1, 2007, pp. 265-279.

International Search Report and Written Opinion received for corresponding International Patent Application No. PCT/CN2009/075967, dated Sep. 30, 2010, 12 pages.

Office Action received for corresponding Chinese Application No. 200980163126.8, dated Apr. 3, 2014, 8 pages.

Partial Supplementary European Search Report dated Nov. 20, 2014, for European patent application No. 09852447.3.

* cited by examiner

METHOD AND CORRESPONDING APPARATUS FOR COORDINATING EXECUTIONS OF INTRA-RADIO HANDOVER

RELATED APPLICATION

This application was originally filed as PCT Application No. PCT/CN2009/075967 filed Dec. 24, 2009.

FIELD OF THE INVENTION

The present invention relates to the field of communication, and more particularly to coordinate the executions of intra-radio handovers.

BACKGROUND OF THE INVENTION

With the development of dual-mode and multi-mode communicating devices, such as mobile phones, multi-radio support at user side becomes more and more attractive. Many solutions have been proposed to efficiently utilize the multi-radio capability at user side without affecting the quality of upper-level services. For example, handoff to another radio when the serving radio runs into a transportation problem (referred to as "inter-system handoff" hereinafter) has been widely discussed and investigated.

Simultaneously using more than one radios at the user side may provide better QoS support, this is because compared with traditional single-radio case, simultaneous dual/multiple radios can provide larger throughput to the user. In addition, a user can use dual/multiple radios to fulfill his/her requirement which can not be met by only one serving radio because of heavy load. On the other hand, multi-radio diversity can also be used to enhance the "cell-edge" performance when radio(s) at the terminal suffer from bad radio conditions.

Simplified illustrative function block diagram of simultaneous multi-radio devices are shown in FIG. 1. When traffic comes to a generic link layer (GLL) agent at a transmitter node, the traffic will be passed to a switch/multiplexer via a transmitter, and the switch/multiplexer will be responsible for dispatching the traffic into different radios. Specifically, the traffic will go through link layer (LL), Wireless Local Area Network (WLAN), Interface Queue (IFQ), Media Access Control (MAC) 802.11, physical (PHY) WLAN, or go through Radio Link Control (RLC) Universal Mobile Telecommunication System (UMTS), IFQ, MAC UMTS, physical (PHY) UMTS, to the wireless channel. At the receiver side, two flows from different radios will be reordered and combined together in the reordering buffer of the GLL agent and then be passed to GLL receiver to provide upper-level a continuous, robust, and high-speed session.

In FIG. 2, two types of simultaneous multi-radio network architecture with different coupling options are shown.

In FIG. 2*a* illustrating tight-coupling option, multi-radio resource manager (M-RRM) performs jointly across the RATs (Radio Access Technology). This means some of the RRM functionalities for specific RATs may be integrated into the M-RRM. The generic link layer (GLL) function block is introduced on top of the RAT-specific link layers to facilitate the cooperation and convergence among different radios. In GLL, functions that would allow for the control and configuration of L2 functionalities of different RATs are provided. To converge different link-layers' traffic flow, traffic dispatcher and combiner functions (such as switcher/multiplexer and reordering buffer showed in FIG. 1) are provided to process the traffic flow for upper layers.

In no-coupling option showed in FIG. 2*b*, two radios are processed and managed separately and can only be converged at an upper layer in which the traffic dispatcher and combiner are provided. Radio resource manager (RRM) in this case is RAT-specific, and GLL only process the traffic and signaling inside the RAT (i.e., GLL is also RAT-specific).

Typically, if one radio is at the cell edge, an intra-radio (intra-system) handover process will be triggered to get connected with a neighboring base station (BS) and resume traffic streams. Hereinafter, an intra-radio handover or an intra-system handover refers to a handover inside one radio, and they can be used exchangeable. An important issue during such intra-system handover is that the traffic break at the user terminal from the time that the user leaves the serving BS to the time that connections are reestablished with a target BS. Such break may cause significant QoS degradation especially for real-time services.

To eliminate the traffic break, soft handover has been introduced into intra-radio handover. In this solution, the user will setup connection with the target BS before it leaves the serving BS, i.e., the handover is performed before its disconnection with the serving BS. Although the traffic break is eliminated in such soft handover solution, it is required that both the serving and target BS transmit the same traffic to/from the handover user device. Hence, the resource consumption is very high. Moreover, soft handover generally can only be performed when the target BS is using the same channel as serving BS (the target BS and the serving BS work at the same frequency). In addition, some present radio systems do not support soft handover at all.

Turning to dual-radio/multi-radio environment, without soft handover, traffic break can also be eliminated by utilizing multi-radio capability at user side. That is, when one radio is in intra-system handover, the traffic on this radio can be switched to another active radio seamlessly. Hereinafter, this solution is called inter-system (inter-radio) handoff. It seems that this solution solves the problem easily.

However, when all the active radios substantially need to perform handover (such as the user moves to a position located at the cell edges of all the radio systems) simultaneously, this solution cannot work. An example is shown in FIG. 3, in which UE (user equipment) 1 and UE2 are dual-radio equipments. In FIG. 3, circles give the coverage of one radio system, and hexagons give the coverage of another radio system. Because UE1 is located at the cell edge in both radio systems, both radios may need to perform intra-system handover. In this case, the above-mentioned solution won't work at UE1 even it has both radio simultaneously working. Therefore, although inter-system handoff can be used to eliminate the traffic break, it cannot work when both/all the radios thereof substantially need to perform handover simultaneously, or when there is a time duration in which both/all the radios thereof are under the execution of handovers.

In multi-radio scenario, there are already many discussions on inter-system handoff (also referred to as inter-system handover or vertical handover), in which a radio will transfer traffic for another radio running into bad conditions. Although such inter-system handoff is a typical process in M-RRM control (for example in RAT selection and congestion control), intra-system handover is seldom discussed as it is generally considered in each RAT-specific RRM. In other words, no one has considered the simultaneous or overlapped intra-radio handover problem in the multi-radio environment.

SUMMARY

The invention provides a method, apparatus and computer products for coordinating the execution of an intra-radio handover.

According to one aspect, provided a method comprising:

determining an intra-radio handover is to be executed on a communication device;

coordinating the execution of the intra-radio handover to determine whether to postpone the execution of the intra-radio handover, so that there is at least one active radio on the communication device.

According another aspect, provided an apparatus comprising:

at least one processor; and at least one memory including computer program code;

the at least one memory and the computer program code configured to, with the at least one processor, cause the apparatus at least to perform:

determine an intra-radio handover is to be executed on a communication device;

coordinate the execution of the intra-radio handover to determine whether to postpone the execution of the intra-radio handover, so that there is at least one active radio on the communication device.

According another aspect, provided an apparatus comprising:

determining unit for determining an intra-radio handover is to be executed on a communication device;

coordinating unit for coordinating the execution of the intra-radio handover to determine whether to postpone the execution of the intra-radio handover, so that there is at least one active radio on the communication device.

According to yet another aspect, provided an apparatus comprising:

means for determining an intra-radio handover is to be executed on a communication device;

means for coordinating the execution of the intra-radio handover to determine whether to postpone the execution of the intra-radio handover, so that there is at least one active radio on the communication device.

According to yet another aspect, provided an apparatus comprising at least one processor; and at least one memory including computer program code;

the at least one memory and the computer program code configured to, with the at least one processor, cause the apparatus at least to perform:

receive a message indicating an execution of an intra-radio handover on the apparatus, perform the execution of the intra-radio handover according to the received message, wherein the execution of the intra-radio handover is coordinated to determine whether to be postponed so that there is at least one active radio on the apparatus.

According to yet another aspect, provided an apparatus comprising:

means for receiving a message indicating an execution of an intra-radio handover on the apparatus, means for performing the execution of the intra-radio handover according to the received message, wherein the execution of the intra-radio handover is coordinated to determine whether to be postponed so that there is at least one active radio on the apparatus.

According to yet another aspect, provided an apparatus comprising:

communicating unit for receiving a message indicating an execution of an intra-radio handover on the apparatus, handover performing unit for performing the execution of the intra-radio handover according to the received message, wherein the execution of the intra-radio handover is coordinated to determine whether to be postponed so that there is at least one active radio on the apparatus.

According to yet another aspect, provided a method comprising:

receiving a message indicating an execution of an intra-radio handover on the apparatus, performing the execution of the intra-radio handover according to the received message, wherein the execution of the intra-radio handover is coordinated to determine whether to be postponed so that there is at least one active radio on the apparatus.

According to yet another aspect, provided an apparatus comprising:

means for receiving a message indicating an execution of an intra-radio handover on a communication device;

means for transferring the received message, wherein the execution of the intra-radio handover is coordinated to determine whether to be postponed so that there is at least one active radio on the communication device.

Optionally, the receiving means receives a request for an intra-radio handover on the communication device and the transferring means transfer this request, before the receipt of the message.

Optionally, the apparatus further comprising means for performing the delay according to the received message.

Optionally, the apparatus further comprising means for determining a delay time duration upon the receipt of the message indicating the execution is to be postponed.

According to yet another aspect, provided a computer readable medium having computer-executable components comprising instructions for implementing according to any of the above method, and apparatus.

Alternatively, the above apparatus can be implemented by hardware, software or combination thereof.

With the above solutions, there is always at least one active radio on the communication device (which supports more than one radio). Therefore, traffic break on the communication device during intra-system handover can be eliminated. Service quality therefore can be better guaranteed.

BRIEF DESCRIPTION OF THE DRAWINGS

These and other features of the present invention will become apparent from the following description of the exemplary embodiments of the present invention with reference to the drawings, wherein.

DETAILED DESCRIPTION OF THE INVENTION

The invention proposes an apparatus which can be embodied in corresponding devices to provide a coordinating function in the above-mentioned simultaneously/overlapped intra-radio handover situation. Hereinafter, we call such apparatus as intra-radio handover coordinator. This coordinator is used to coordinate the execution of intra-system handover on dual-radio/multi-radio device to avoid the situation in which all radios of the device are executing intra-system handovers simultaneously, or there is an overlapped area in time in which all radios of the device are executing intra-system handover. With this coordinator, there will be at least one active radio available at the devices, such as UE requesting handover(s). This coordinator can be introduced into the present related devices/apparatus capable of delaying the execution of an intra-radio handover, for example devices/apparatus managing the execution of handover or managing the resources, such as, multi-radio resource manager or multi-radio controller mentioned above. In addition, the proposed intra-radio handover coordinator could be implemented in different multi-radio coupling options such as the ones shown in FIGS. 2a and 2b.

Figure 1:
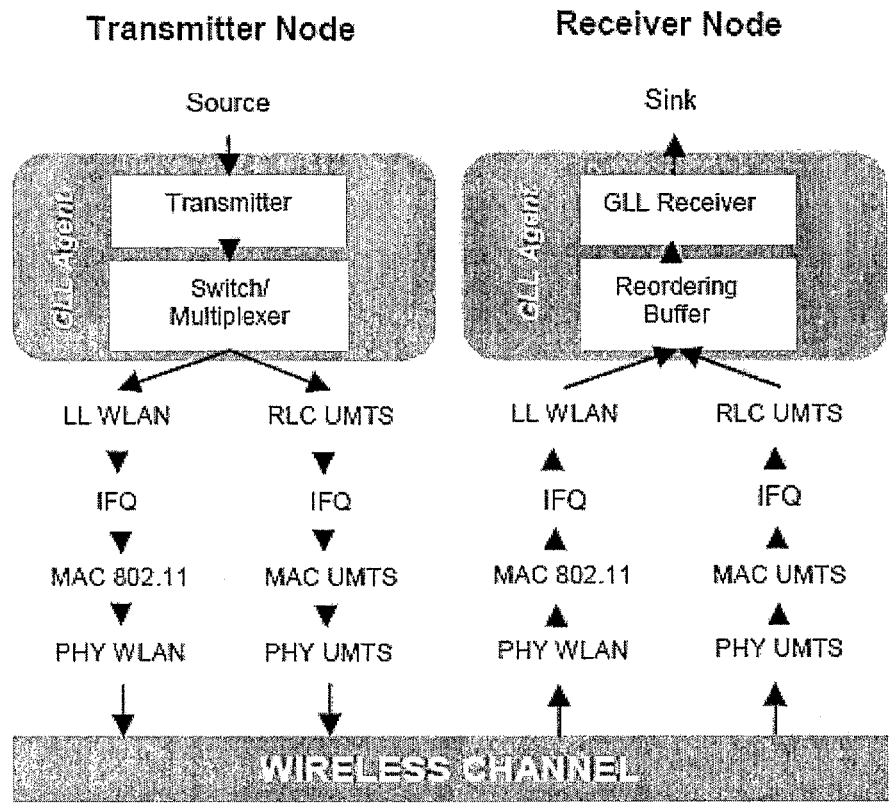
FIG. 1 is a simplified function block diagram of multi-radio device.
Figure 2A:
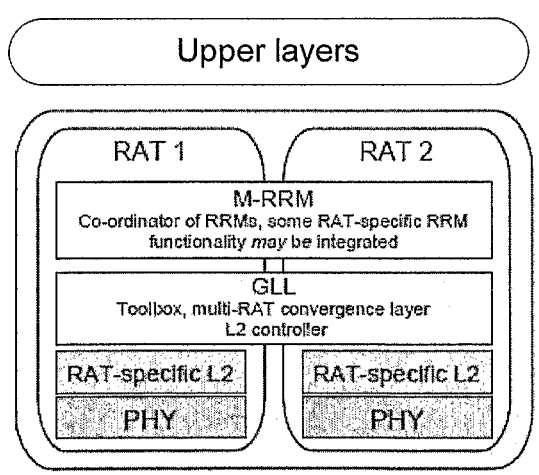
FIG. 2a is a diagram illustrating a multi-radio network architecture with tight coupling.
Figure 2B:
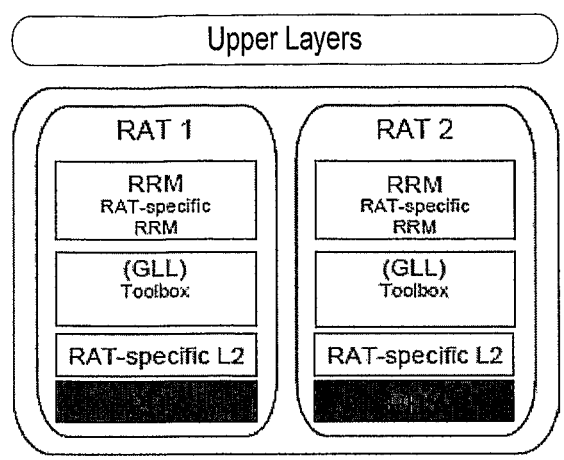
FIG. 2b is a diagram illustrating multi-radio network architecture without coupling.
Figure 3:
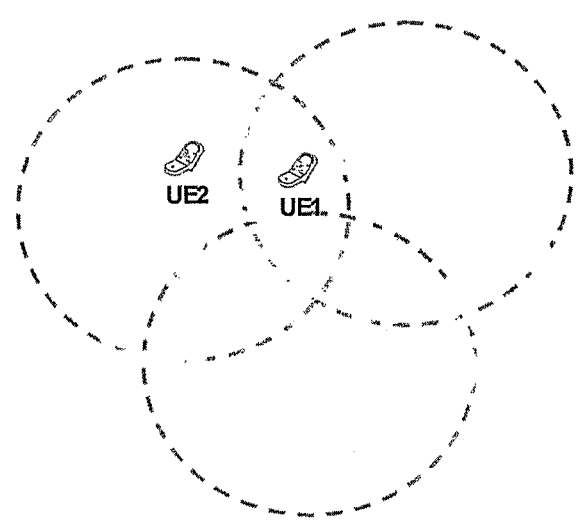
FIG. 3 is a diagram illustrating a coverage example of a dual-radio support environment.
Figure 4:
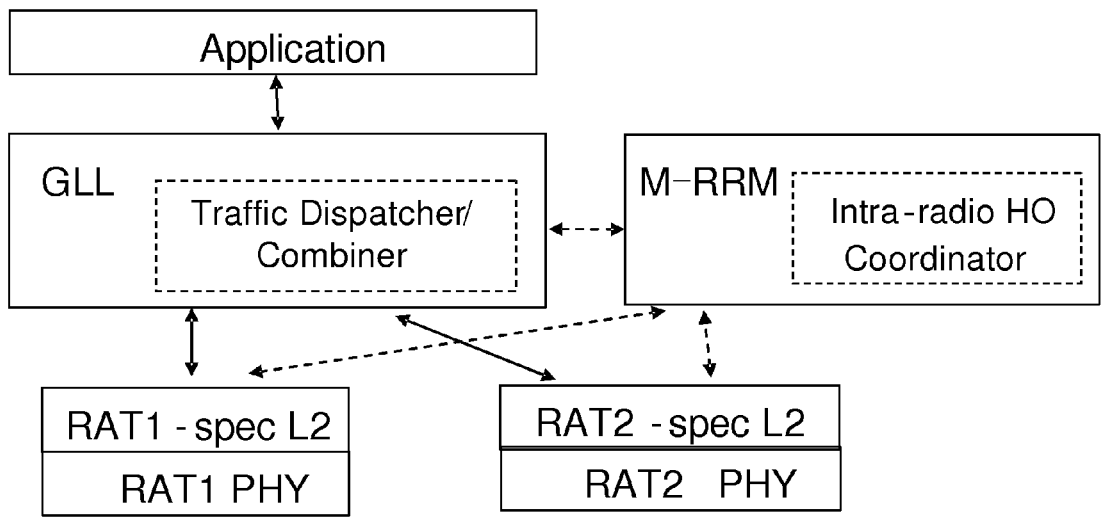
FIG. 4 is a diagram illustrating the tight-coupling dual-radio architecture in which the intra-radio handover coordinator according to an exemplary embodiment of the invention is applicable.

FIG. 4 shows a diagram of the tight-coupling dual-radio architecture in which the intra-radio handover coordinator according to an exemplary embodiment of the invention is applicable. In the tight-coupling multi-radio architecture as shown in FIG. 2a, GLL schedules the arrived traffic to different radios according to configuration by M-RRM, in order to coordinate the intra-system handover process happening in both radio systems, the proposed intra-radio handover (HO) coordinator can be located in M-RRM so that interface between GLL and M-RRM can be fully reused for such intra-system handover control. As shown in FIG. 4, the dashed lines represent signaling flow between the newly incorporated intra-radio handover coordinator and the GLL or RAT-specific layer, while the solid lines represent the traffic flows between the GLL and respective RAT-specific layers. After incorporating the coordinator, M-RRM can not only manage the inter-system handoff, but also perform the coordination for intra-system handovers happening in the respective multiple lower-layer radios, such as RAT1-specific Layer 2 and RAT2-specific Layer 2 shown in FIG. 4.

Figure 5:
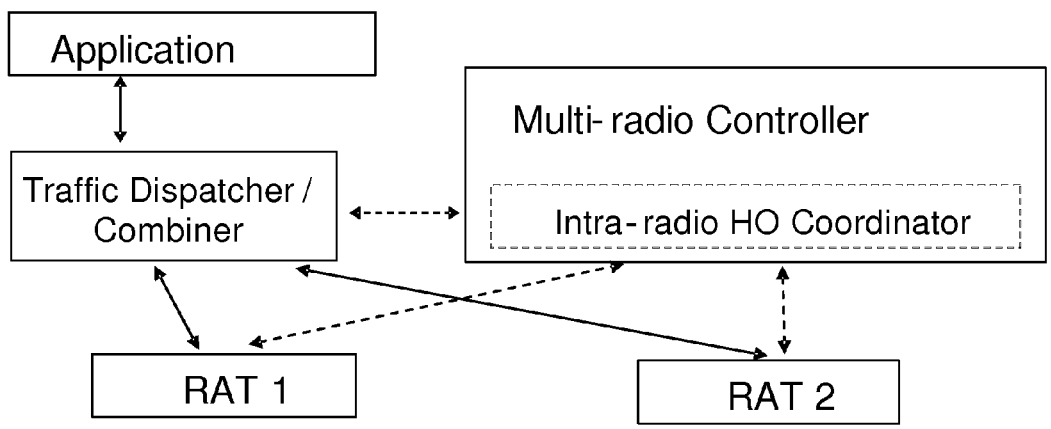
FIG. 5 is a diagram illustrating the non-coupling dual-radio architecture in which the intra-radio handover coordinator according to an exemplary embodiment of the invention is applicable.

FIG. 5 shows a diagram of the non-coupling dual-radio architecture in which the intra-radio handover coordinator according to an exemplary embodiment of the invention is applicable. In the case of no-coupling multi-radio architecture (shown in FIG. 2b), the intra-radio handover coordinator can be located in control blocks/functions in upper layers as shown in FIG. 5. In FIG. 5, because there's no coupling between RAT1 and RAT2, traffic dispatcher/combiner located in an upper layer, for example in IP layer. There is a multi-radio controller for controlling the traffic dispatcher/combiner based at least in part on the status of different RATs. The proposed intra-radio handover coordinator therefore can be located in that controller for easy traffic control.

It is noted that although FIGS. 4 and 5 give examples of the implementation of the intra-radio handover coordinator according to exemplary embodiments of the invention, they are just specific examples and there are many other alternatives for those skilled in the art. For example, the intra-radio handover coordinator can be embodied into other functional blocks or devices, or it can be a separate block, so long as it can communicate with related control means, functions or devices, such as communicate with the M-RRM in FIG. 4 or the Multi-radio controller in FIG. 5.

Figure 6A:
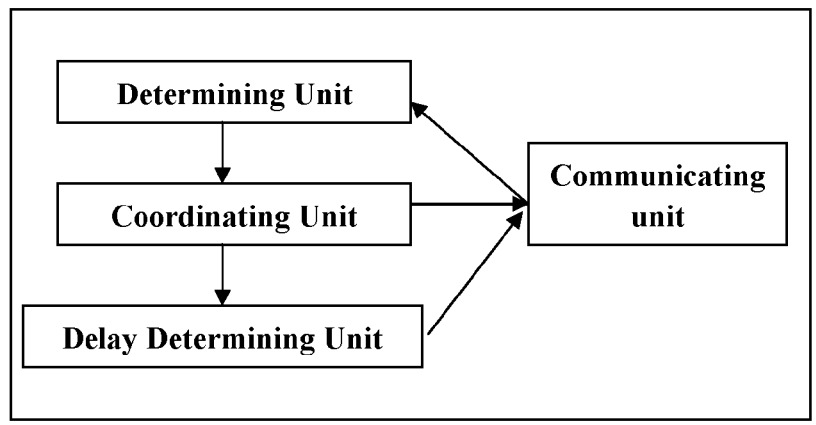
FIG. 6a is a block diagram illustrating the intra-radio handover coordinator according to an exemplary embodiment of the invention.

FIG. 6a shows an exemplary structure of the intra-radio handover coordinator according to an embodiment of the invention. As shown in FIG. 6a, the coordinator comprises a determining unit/means for determining an intra-radio handover is to be executed on a communication device. Such determination can be made for example, upon the fact that a degradation of the communication quality in a radio supported by a communication device is found. The coordinator further comprises a coordinating unit/means for coordinating the execution of the intra-radio handover to determine whether to postpone the execution of the intra-radio handover, so that there is at least one active radio on the communication device. In this way, the proposed coordinator can ensure that there is at least one active/working radio at the device on which the intra-radio handover(s) is to be performed.

Additionally/Optionally, the apparatus can further comprises a communicating unit/means for communicating with other network functions or devices. The above determination can be made upon receiving a request of intra-radio handover from a communication device, such as a UE, via the communicating unit.

Additionally/Optionally, the communicating unit may further transmit a message indicating the execution of the intra-radio handover on UE.

Additionally/Optionally, the apparatus may further comprise a delay determining unit/means for determining a delay time duration, if the execution of an intra-radio handover is determined to be postponed.

Optionally, the above coordinator can be located in a base station, eNodeB, an access point, a controller, or a UE. If the coordinator is located in a UE, when the UE founds that it needs to perform a handover by its determining unit, its coordinating unit performs its coordination function to see whether to postpone this handover, and if not, the communicating unit will send a request for the handover; otherwise, the delay determining unit will determine a time duration, the request will be sent by the communicating unit until the determined delay expires.

From the description below, the operations performed by this coordinator will become more apparent.

Figure 6B:
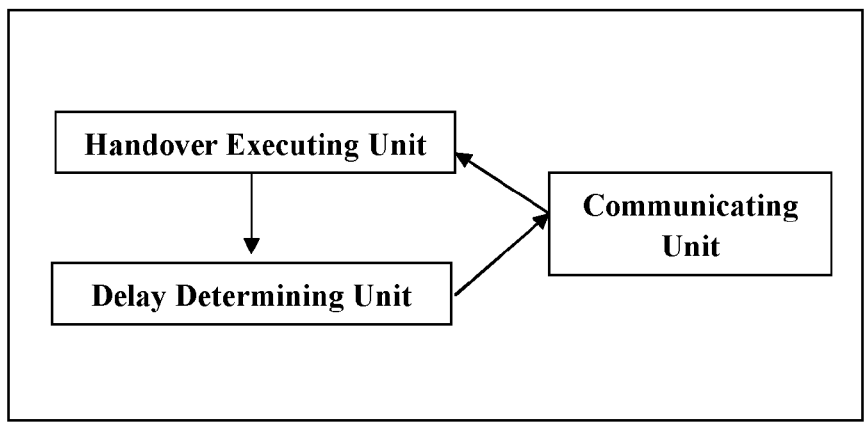
FIG. 6b is a block diagram illustrating the user equipment according to an exemplary embodiment of the invention.

FIG. 6b shows an exemplary structure of an user equipment according to an exemplary embodiment of the invention. As shown in FIG. 6b, UE comprises a communicating unit/ means for receiving a message indicating an execution of an intra-radio handover on UE, and a handover performing unit/ means for performing the execution of the intra-radio handover according to the received message. Here, the execution of the intra-radio handover is coordinated to determine whether it is to be postponed so that there is at least one active radio on UE.

Additionally/Optionally, the communicating unit of the user equipment sends an intra-radio handover request for example to the proposed coordinator first and then receives a response therefrom.

As will be described below, the executions of such intra-radio handovers are coordinated by a proposed coordinator to ensure that there is at least one active radio on UE. In this case, the received message may indicate whether the execution of the intra-radio handover is to be postponed. If the response comprises a delay time value, the handover executing unit will postpone the handover according to the delayed duration.

Additionally/Optionally, if the received message indicating performing the execution of the intra-radio handover with a delay but doesn't provide a determined delay duration, the user equipment can further comprises a delay determining unit/means for determining a delay time duration and perform the execution of the intra-radio handover with the determined delay time duration.

Figure 6C:
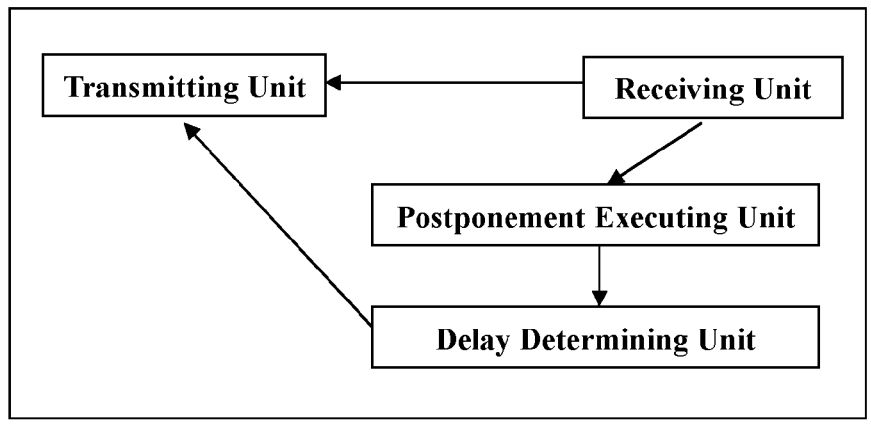
FIG. 6c is a block diagram illustrating the serving BS according to an exemplary embodiment of the invention.

FIG. 6c shows an exemplary structure of the serving BS according to an embodiment of the invention. As shown in FIG. 6c, the serving BS may comprise a receiving unit/means for receiving information, such as receiving a message indicating the execution of the intra-radio handover on a communication device, such as a UE, and a transmitting unit/means for transferring the received information to related communication device, such as the UE. Alternatively, the above receiving unit and the transmitting unit can be combined together.

Additionally or alternatively, the serving BS may further comprise a postponement executing unit for performing a delay according to the received message, and then the received message, such as en execution of an intra-radio handover on a UE (without a delay) is transferred from the transmitting unit to the UE.

Additionally or alternatively, similar with the situation mentioned in FIG. 6b, if the message doesn't comprise a determined delay time value, the BS may further comprise a delay determining unit for determining or computing such delay duration itself. Then, the determined time duration may be transferred by the transmitting unit together with the received message, and the delay will be performed by other network elements, such as the UE. Optionally, such determined time duration may be used by the postponement executing unit to perform a delay.

Additionally or alternatively, the receiving unit may receive an intra-radio handover request first, that means before receiving any message on the execution of a handover. Then this request is transferred by the transferring unit to other network elements, such as the proposed coordinator, so that the execution of the requested intra-radio handover is coordinated for example by the coordinator to keep that there is at least one active radio on the requesting party, such as UE. Upon receiving a response from the coordinator by the receiving unit, the BS will perform as the above.

The above structural figures show exemplary embodiments of the invention, and for simplify those figures, only elements relevant to the invention are shown. However, those skilled in the art will understand that the specific structure of the coordinator, UE and serving BS may be modified, combined, and may comprise any other functions or blocks or necessary hardware or software or the combination thereof, if necessary.

It is noted that, for a person skilled in the art, those functions/apparatus explained with the non-limiting examples showed in FIGS. 6a-c can be implemented as hardware, software, or the combination thereof. For example, all the units/ means shown in those figures can be implemented as computer program code embodied in at least one memory, and the memory, the computer program code together with a processor may cause an apparatus to perform the above functions/ the following method steps, or can be implemented as chips, etc.

Figure 7:
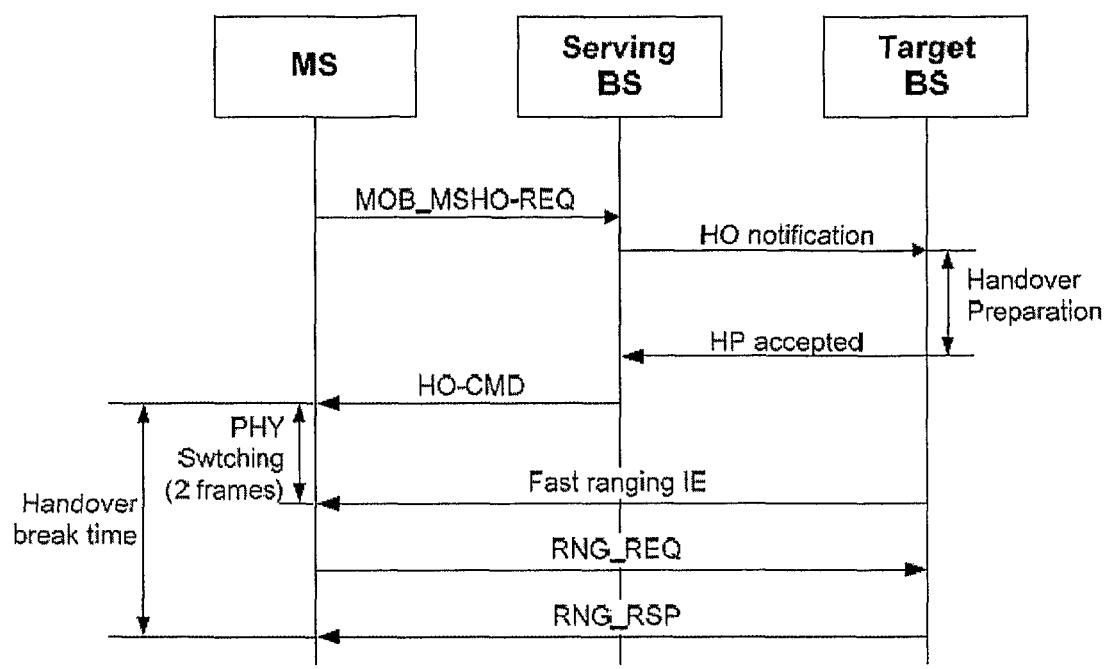
FIG. 7 illustrating a traditional BS-controlled handover process.

Now we will discuss the method process of the invention. First, let's see a traditional BS-controlled handover process as shown in FIG. 7. In FIG. 7, signaling exchanges among a Mobile Station (MS), Serving BS and a Target BS are shown. As shown in FIG. 7, when MS founds a handover is necessary, it sends MOB_MSHO-REQ to its serving BS, the serving BS then sends HO notification to the target BS. Upon receiving this notification, the target BS performs handover preparation and then feeds back handover preparation accepted signaling to the serving BS. The serving BS then sends a handover command (HO-CMD) to the mobile station. After receiving such handover command, the mobile station performs the execution of the handover during which the connection with the base station will be interrupted. The break time is shown in FIG. 7. During this break time, the mobile station generally obtains synchronization on the downlink and the uplink, performs physical layer switching (approximately 2 frames), receives a fast ranging information element transferred from the target BS, sends a ranging request to the target BS and from which receives a ranging response, etc. A person skilled in the art understands that this is just a non-limiting example for the purpose of illustrating an intra-radio handover, and the process shown in FIG. 7 is just part of a handover process.

Figure 8:
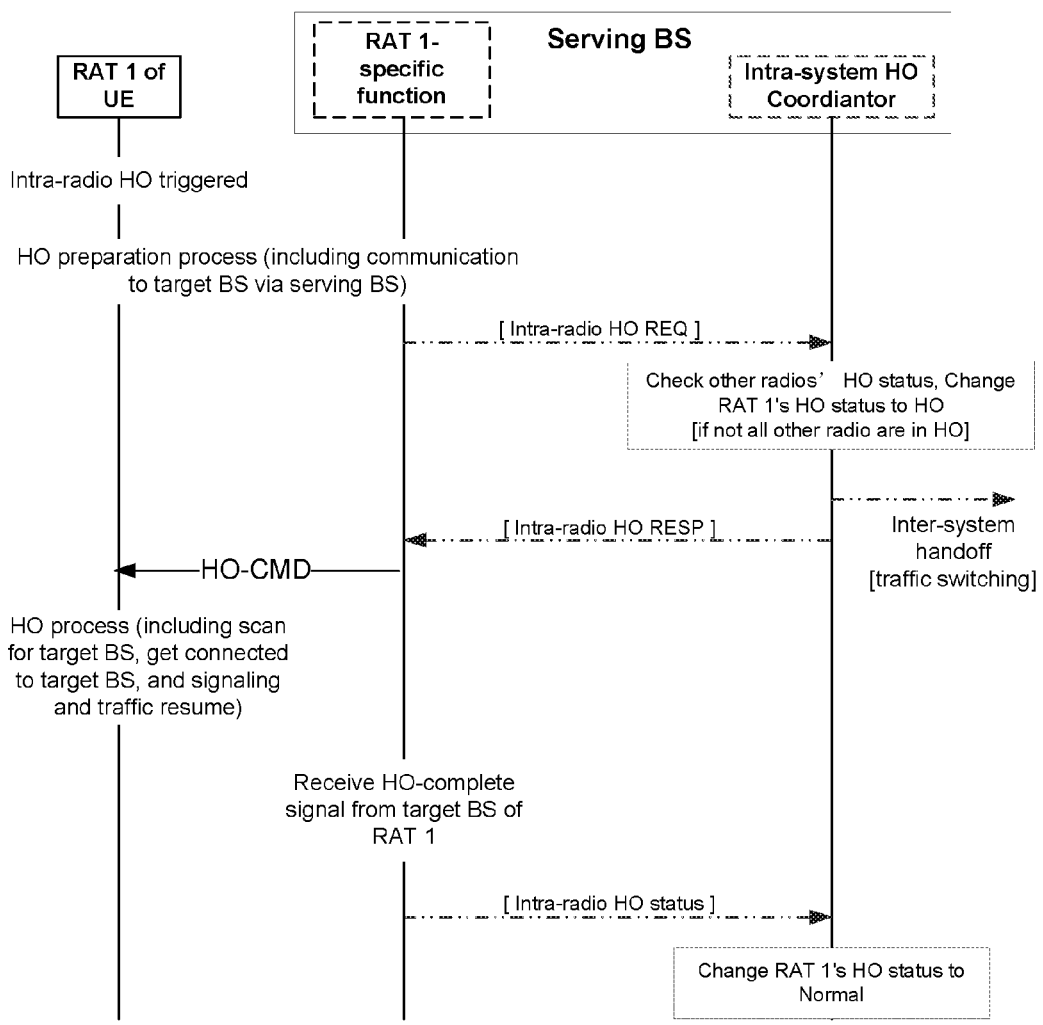
FIG. 8 shows the flowchart of the intra-radio handover coordination in which the requested intra-radio handover will be performed traditionally according to an exemplary embodiment of the invention.
Figure 9:
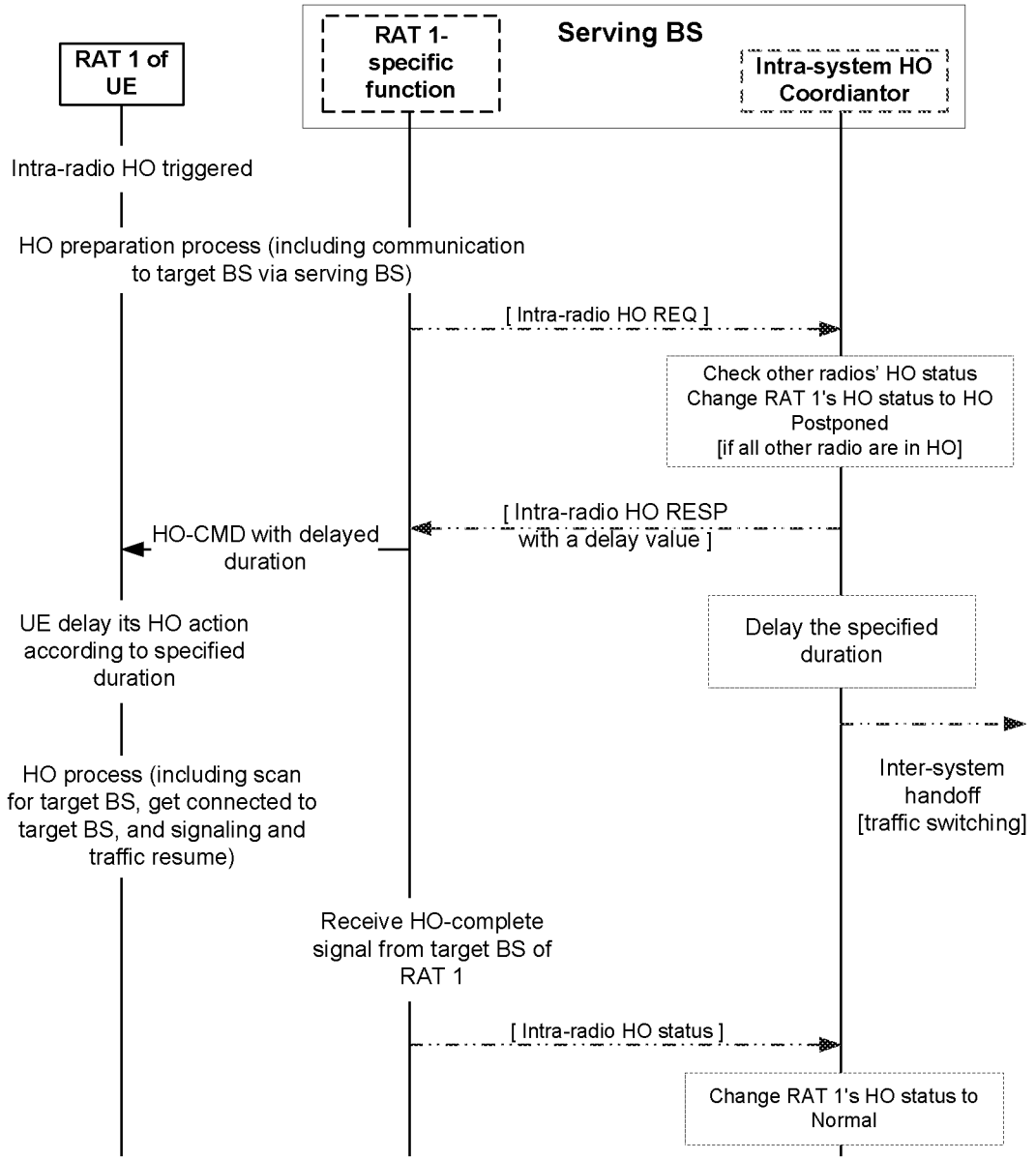
FIG. 9 shows the flowchart of the intra-radio handover coordination in which the requested intra-radio handover will be postponed according to an exemplary embodiment of the invention.

FIGS. 8 and 9 show different processing procedures with reference to the process discussed together with FIG. 7.

FIG. 8 shows the flowchart of the intra-radio handover coordination according to one exemplary embodiment of the invention in which the requested intra-radio handover will be performed traditionally. In this embodiment, the intra-system handover coordinator is incorporated into the serving BS of a UE. As shown in FIG. 8, RAT1 of UE founds an intra-radio handover is necessary, and triggers such handover (corresponding to such as MOB_MSHO-REQ shown in FIG. 7). Then, upon receiving handover related requests, RAT1-specific function of serving BS (sBS) performs handover preparation process, including for example, communication with the target BS. Thereafter, before sending the handover command back to UE as conventionally does, RAT1-specific function sends an intra-radio handover request to the intra-system handover coordinator of the invention first. Upon receiving the request, the coordinator checks the handover status of other radios on the user equipment. If not all other radios on the user equipment are in handover status, the coordinator may send an intra-radio handover response to RAT1-specific function to indicate that the handover can be performed normally (without a delay), and perform the inter-system handoff to transfer the traffic on this radio to other active radios to avoid a break time at appropriate time. Optionally, the coordinator may remain the status of respective radios supported by UE, and in this case, changes the handover status of RAT1 of this UE as "Handover", and change the handover status of RAT1 of this UE to "Normal" upon receiving a message indicating the intra-radio handover status sent by RAT1-specific function. Upon receiving the response sent from the coordinator, RAT1-specific function sends handover command to the UE as usual. Optionally, in order to get a better compatible with the exist solutions or standardized processes, the coordinator sends a response immediately after it accomplish its operations, and RAT1-specific function of the serving BS starts to execute the intra-system handover, i.e., send the handover command immediately. After receiving this command, UE will perform the execution of handover intra RAT1, including for example scanning for target BS, getting connected with the target BS, signaling and traffic resume or the like, which is shown as break time in FIG. 7. After this, FIG. 8 also shows a post handover process not shown in FIG. 7, i.e., the RAT1-specific function receives handover complete messages from the target BS of RAT1 of UE. Then, if the coordinator keep the handover status of UE itself, RAT1-specific function forward this message to the coordinator for an update.

Alternatively or additionally, the coordinator may send a response to the RAT-specific function only when the handover is decided not to be delayed (in the case that for example, a delay is performed by the coordinator itself, if any), or when the handover is decided to be delayed with the determined delayed time, or when the handover is decided not to be delayed without the determined delayed time, or no matter the handover is to be delayed a response will be sent. Any way, many applicable alternatives may be adopted by a person skilled in the art.

FIG. 9 shows the flowchart of the intra-radio handover coordination in which the requested intra-radio handover will be postponed according to an exemplary embodiment of the invention. In FIG. 9, most of the operations thereof are similar with the ones in FIG. 8. The differences thereof relate to the operations performed between the "intra-radio HO REQ" and "HO process". In FIG. 9, RAT1-specific function sends the intra-radio handover request to the coordinator to perform the coordination of the execution of this intra-radio handover. Upon the receipt of this request, the coordinator checks the handover status of other radios working on the UE. In this case, if the coordinator founds that all the other radios are in handover (HO) status, it determines to postpone this intra-radio handover process to ensure that there is at least one active radio on the UE for traffic carrying. Similarly, the coordinator may keep related handover status information itself, and changes the handover status of RAT1 of UE to "Handover Postponed" in this case. Also, the coordinator sends a response with a delay value. Here, the coordinator can determine a delay time according to the detailed HO status in each radio. For example, the time to delay can be calculated based at least in part on the average HO execution time (statistically computed or configured in advance) in each radio system. As for the delayed duration, typically, it can be set as 100~400 ms. However, a person skilled in the art understands that the delay value can be determined based at least in part on particular requirements, such as taken into account the network architecture, the QoS or the like. Optionally, in order to get a better compatible with the present (standard) processes, the HO command with a delay value will be immediately sent by RAT1-specific function to UE after the arrival of "Intra-system HO response" from the coordinator. When the UE receives the HO command with a delay value, it will delay its handover action according to the received determined delayed duration. Then, when such duration expires, it begins its normal handover process, such as starting scan for target BS of RAT1. The following process is similar with FIG. 8 and will not be repeated here. With respect to the inter-radio handoff performed by the coordinator, as shown in FIG. 9, the coordinator may perform this at an appropriate time during/after the delayed duration, that means at least before the execution of the certain intra-radio handover, transferring the traffic on that radio to the radio whose handover is postponed. Similarly, the coordinator may receive corresponding message indicating the handover status, if it keep such information.

A person skilled in the art will easily understand that those messages exchanged between RAT-specific functions and the proposed coordinator can be standardized if a standard interface is required between the RAT-specific functions and the coordinator or any other functions in which the coordinator is embodied, such as multi-radio joint-processing functions. For example, related messages can be specified in S1 interface in LTE-A if the coordinator is located in 3GPP core network (which can be shared by multiple access radios).

In FIG. 9, the delay value is transferred by the coordinator and the RAT1-specific function and it is UE which delay the execution of the handover process, in other words, the delay operation is performed by UE. Additionally/Alternatively, it is also possible to design that the coordinator waits for the determined postponed time duration and then feeds back the intra-radio handover response to the RAT1-specific function, in other words, the delay operation is performed by the coordinator. In this case, there are no additional operations required to be performed by UE. In another alternative exemplary embodiment, the delay operation can be performed by the RAT-specific function of the serving BS. In this case, there is also no additional operation required to be performed by UE, but the additional delay operation will be introduced into the RAT-specific function of the serving BS or at least into the serving BS. However, if the UE moves out of the coverage of the serving BS before the receiving the handover command from the serving BS, the latter two implementations may not work ideally. Then the specific implementations may be selected or designed at least in part on the basis of the certain requirements or applicable environment. For example, if the coverage of BSs in particular network environment are small, or the UE is always move fast and frequently, then the first implementation described with reference to FIG. 9 can be selected; if the coverage of BSs are relatively large and the UE is moving slowly, then the latter two can be used; or otherwise, a person skilled in the art may use the combination of any of the above solutions to meet certain requirements. Anyway, the above solutions are exemplary, and a person skilled in the art can make any suitable or applicable changes for specific usage. Additionally or alternatively, for the above exemplary embodiments, the delay time value may be computed by the coordinator and indicated to the serving BS and/or UE, or it can also be computed by the apparatus which transfers a message indicating such delay, or by the apparatus which performs the delay operation, such as computed by the BS or UE. In the latter case, the coordinator may just feedback a message indicating a postponement of an intra-radio handover without any determined delayed duration.

Additionally or alternatively, it may be not necessary for the coordinator to wait for the response indicating the intra-radio handover status from the RAT-specific function of the serving BS. In this case, there are many alternative mechanisms. For example, the coordinator may change the handover status of the RAT requesting the intra-radio handover to "Normal" after predefined time interval, this time interval may be an average of time interval for a traditional handover in the case of FIG. 8, or sum of the ordinary time interval for a traditional handover and the delayed duration in the case shown in FIG. 9, unless receiving any failure messages from the RAT-specific function of the serving BS.

Additionally or alternatively, it may be not necessary for the coordinator to keep the specific handover status of respective radios on a communication device, such as a UE. Instead, the coordinator may obtain any necessary information from a certain communication device, or any other related network elements, such as UE, BS or a specific database or the like.

Alternatively, the coordinator can be located in other apparatus, devices, or functional blocks or any other applicable locations so long as it can delay the execution of any intra-radio handover on a communication device when necessary. It should be noted that RAT-specific function of a serving BS in the above content is just an example for the purpose of explaining, it can be substituted by other means or functions. In fact, it can be any means, functions or devices which control the execution of the intra-radio handover.

It is also easily understand by a person in the art that, the proposed coordinator is applicable in the above tight coupling or without coupling network architecture. Specifically, with tight coupling architecture, the coordinator may locate in a multi-radio resource controller/manager which controls/manages the usage and status of more than one radio. With the no-coupling network architecture, the coordinator may locate in a multi-radio resource controller/manager in an upper layer. Moreover, it is also possible that the coordinator locate in a normal serving BS, i.e., a BS supporting a single radio. In this case, the coordinator may obtain any necessary information, such as the handover status of the radios on a UE, from other coordinators, from the communication device UE or any other appropriate network elements, such as a database.

In addition, although FIGS. 8 and 9 show the case that an intra-radio handover is triggered by UE, it is also possible that the coordinator found a necessary handover itself. For example, as BS, access point or other control elements know the communicating status/quality of a radio supported a communicating party/device, it may determine whether a handover is necessary and informs this to the communication device. Therefore, the proposed coordinator locating in or capable of communicating with those control elements can determine whether a handover is necessary, or whether a handover is to be performed without a request from the UE.

Figure 10:
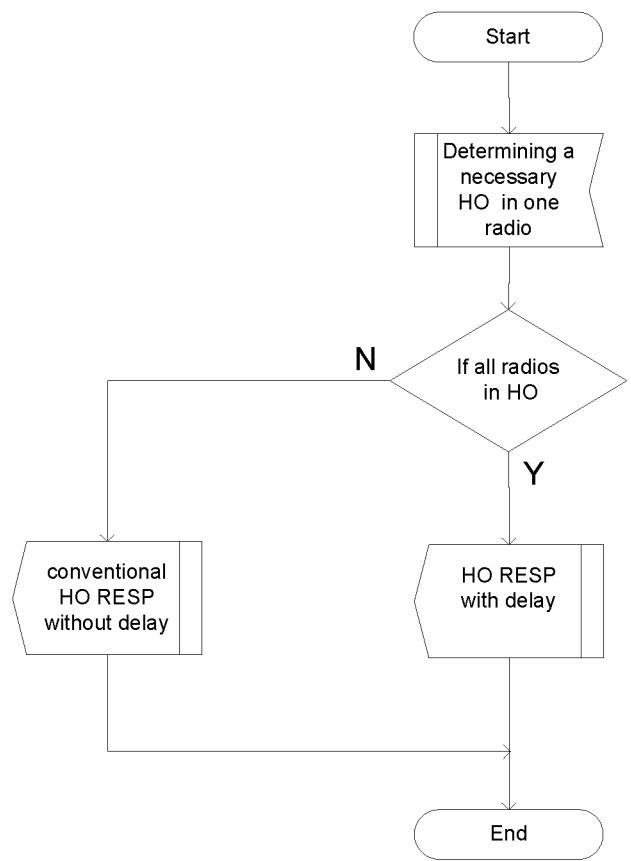
FIG. 10 illustrating the detailed processing when the proposed coordinator receives an intra-radio HO request according to an exemplary embodiment of the invention.

The detailed processing when the proposed coordinator founds a necessary intra-radio HO request is shown in FIG. 10. When the coordinator founds an intra-radio HO request is necessary, it checks if all other radios belonging to this UE are in HO status. If yes, then the new requested HO will be postponed and the coordinator will send a response with a HO-execution delay value. Otherwise, a response without delay will be sent to the RAT-specific functions controlling the execution of the intra-radio handover, and HO in that RAT will be performed normally.

In the case that multiple handovers are found necessary, it is interesting to find which radio should be selected to postpone its HO execution if all other radios of the UE are in HO status.

Figure 11:
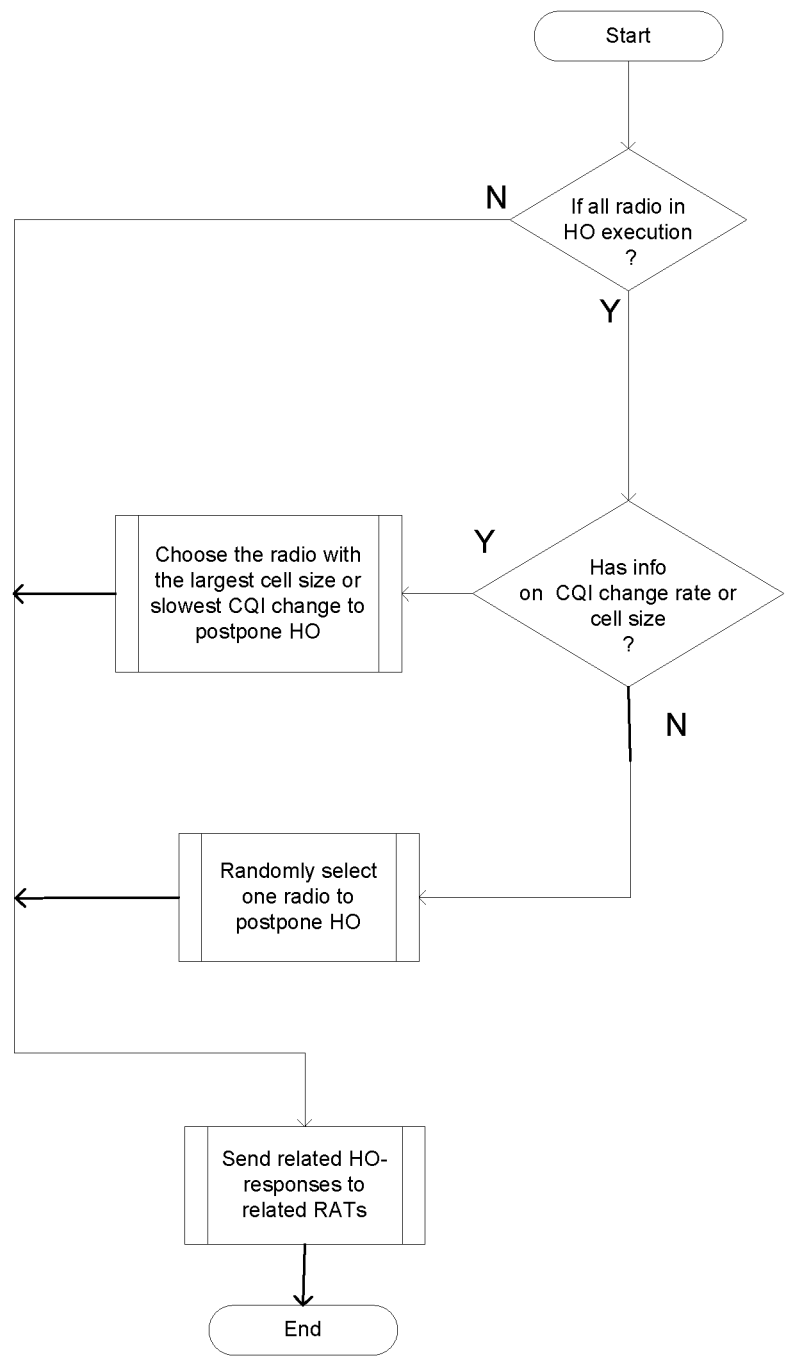
FIG. 11 illustrating a selection algorithm of the postponed intra-radio handover when simultaneous or overlapped intra-radio HO requests occur.

A selection mechanism of the postponed intra-radio handover when more than one intra-radio HO are found necessary is shown in FIG. 11, where CQI (Channel Quality Indicator) change rate and cell size are used as the bases for such selection. If the coordinator founds not all other radios on the UE are in HO status, it will send a handover response to related RAT-specific functions as usual. Otherwise, the RAT whose channel changes slowest will be selected to postpone its HO execution and keep its UE-BS connections for a determined duration so that this RAT can deliver traffic for other RATs when they are executing HO. In this way, radio link which changes faster can be utilized more efficiently, as handover is firstly and relatively faster executed at that radio, thereby signaling connections resumes quickly on that radio and CQI information of the new link can be obtained in a shorter time. Thus other radios under handover execution may transfer their traffic to the newly resumed connections of this radio. If the coordinator has no information on CQI changes, cell size can be considered as a criterion to select a RAT to be postponed. This is because the CQI change is generally slow in a RAT with large cell size. If there is no available related information for the coordinator, it can randomly select one radio to postpone its HO execution. In this embodiment, the coordinator may comprise a storage to keep related parameters for respective RAT.

Optionally, to ease the above selection, an intra-system HO request message may contain a RAT identity, the CQI change speed, cell size information, etc. The intra-system HO response message may contain RAT identity, HO execution delay time or the like, if necessary.

As traffic can be switched to some other radio(s) of UE in normal working status If not all radios are in HO status, FIG. 11 shows only utilizing the proposed coordination mechanism in the case where all other radios at a user equipment are under HO executions. However, it is also possible that two or more intra-radio handovers of RATs are selected to be postponed when the radio number at the UE is large or for meet higher requirements, then the user will have a better experience as the proposed coordinator ensures more than one active radios at the UE all the time. In this case, the coordinator may decides to postpone an intra-radio handover if it founds that the number of radios in handover status on the UE is higher than a threshold, or if the number of active radios on the requesting party is lower than a threshold.

Additionally or alternatively, the selection can be based at least in part on any criterions indicating the channel changing rate or the time consumed by a certain intra-radio handover. For a person skilled in the art, there are many parameters can be utilized, such as channel quality indicator, cell size, signal to noise ratio, signal to interference plus noise ratio, signal to noise distortion ratio, carrier to interference plus noise ratio, and received signal strength indicator, or the like.

Figure 12:
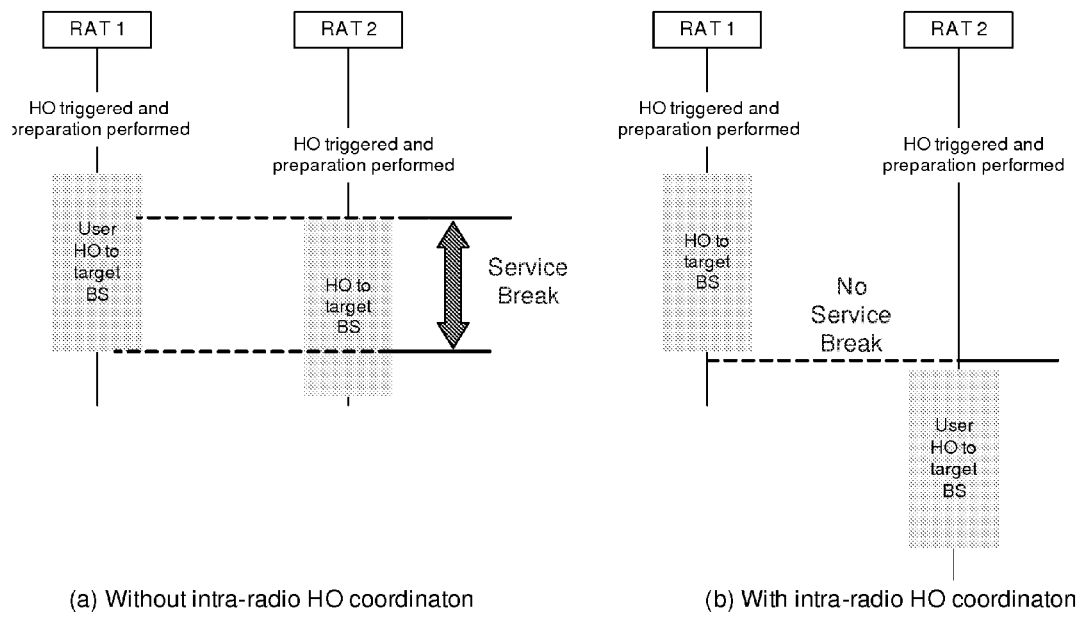
FIG. 12a illustrating the service break caused by conventional executions of intra-system HO.
FIG. 12b illustrating the effect of the proposed coordination of the executions of intra-system HO.

The effect of coordination of the executions of intra-system HO can be seen in FIG. 12, where only two radios are assumed to be working at UE. In FIG. 12*a*, two radios perform their HO almost simultaneously without the proposed coordination. In the overlapped HO execution duration, services have to be interrupted because no radio at UE can provide a successful connection. As shown in FIG. 12*b*, with HO coordination, the HO execution process can be controlled and scheduled, thus the simultaneous HO execution will be avoided. Precisely speaking, there will not be an overlapped HO execution duration, because the coordinator ensures that there is always at least one active radio on UE. Hence, no service will be interrupted as we can see from FIG. 12*b*.

The above detailed descriptions have explained the invention with reference to exemplary embodiments. Upon those explanations, a person skilled in the art will conceive many alternative implementations. For example, from above we can see that the location of the coordinator can be selected arbitrarily, so long as the execution of a certain intra-radio handover can be postponed if necessary. The above RAT-related functions refer to any entity or soft function block controlling the execution of the intra-radio handover. Moreover, the shown flowchart can also be changed, especially the order of at least part of the steps. For example, the coordinator can be placed before the RAT-specific function in the flow chart, this means the coordinator will receives the message indicating that a certain radio on UE requires a handover first. In this case, the coordinator may determine whether to postpone this handover first. Then if an intentional delay time is needed, it may transfer the received message to the RAT-specific function until the delayed duration expires, or send the received message to the related function together with the delay time value. In the latter case, the actual delay operation may be performed by the RAT-related function, or by the UE according to the indicated delayed duration sent from the RAT-related function. Therefore, those skilled in the art will readily understand that the proposed coordinator can be introduced into any of those steps locating before the actual executions of intra-radio handover. In addition, this coordinator is applicable to the existing process procedures, and is also applicable to the new process procedures proposed in the future.

Figure 13:
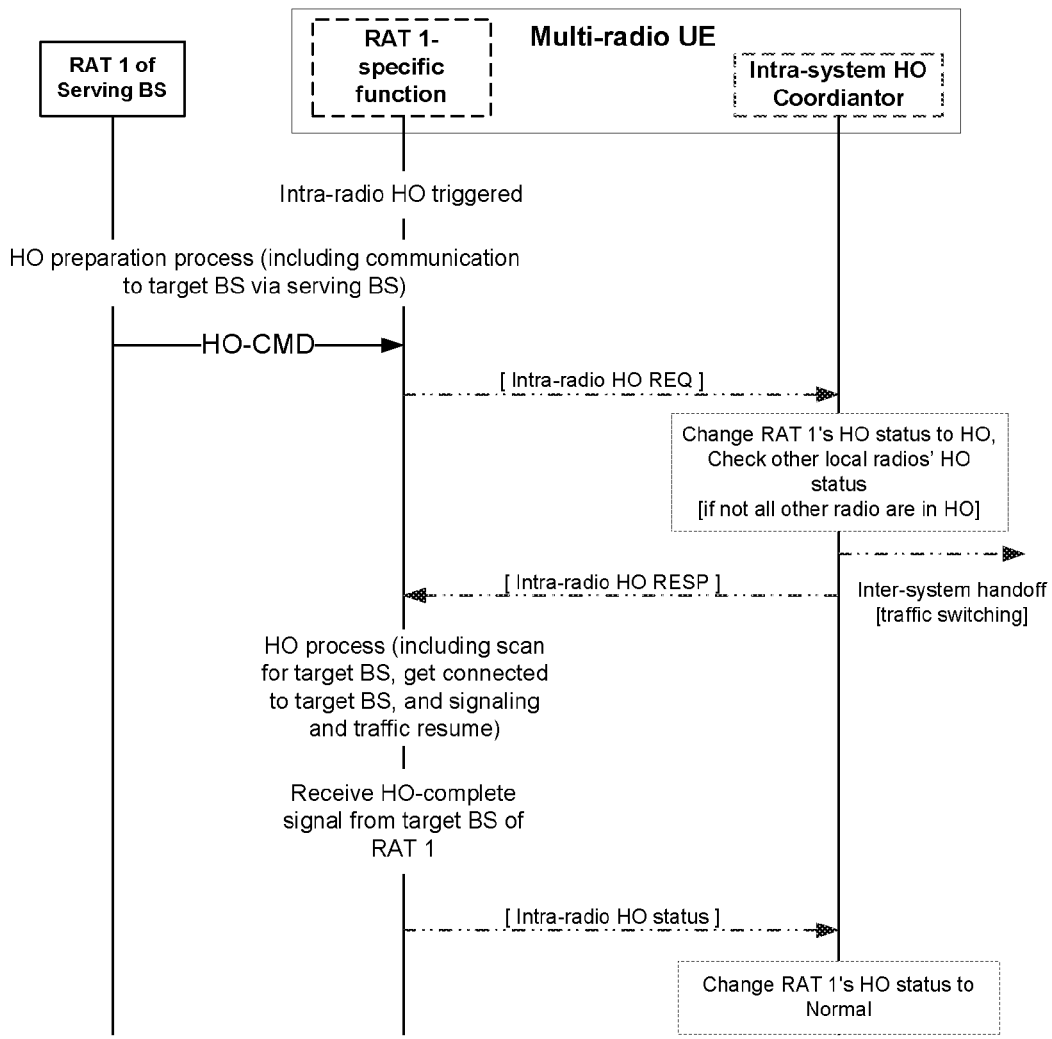
FIG. 13 shows the flowchart of the intra-radio handover coordination in which the requested intra-radio handover will be performed traditionally according to another exemplary embodiment of the invention.
Figure 14:
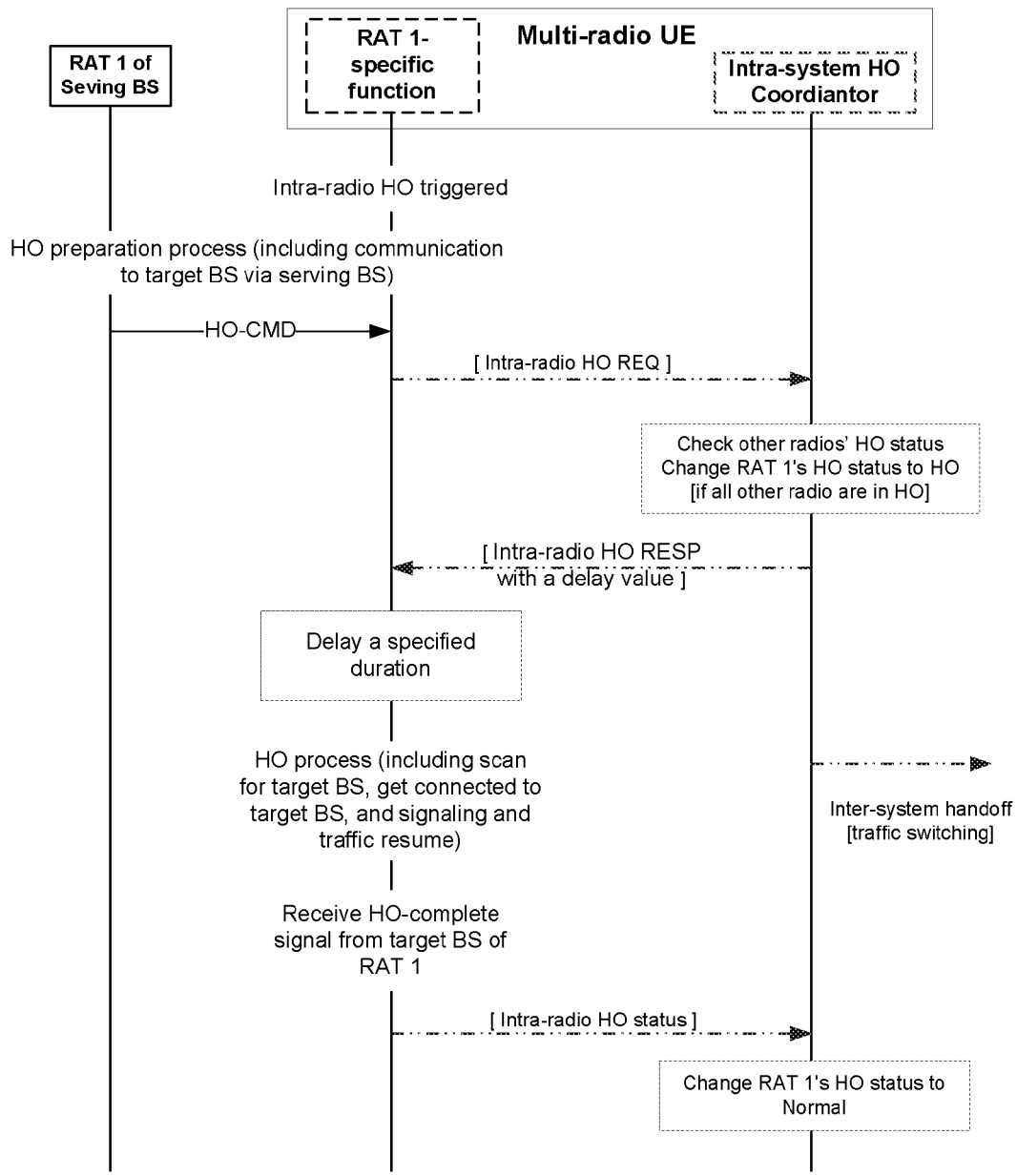
FIG. 14 shows the flowchart of the intra-radio handover coordination in which the requested intra-radio handover will be postponed according to another exemplary embodiment of the invention.

Alternatively, the proposed coordinator can also be embodied in UE, in which only changes to UE are required. FIG. 13 shows the flowchart of the intra-radio handover coordination in which the requested intra-radio handover will be performed traditionally according to another exemplary embodiment of the invention, and FIG. 14 shows the flowchart of the intra-radio handover coordination in which the requested intra-radio handover will be postponed according to another exemplary embodiment of the invention. In FIGS. 13 and 14, those operations or steps are corresponding to the ones in FIGS. 8 and 9. The difference is that as the proposed coordinator is embodied in a multi-radio UE, the RAT-specific function of UE can communicate with the coordinator inside UE after receiving handover command sent from its serving BS and before performing the handover process to see whether it is necessary to postpone the execution of this intra-radio handover. Alternatively, this communication process between the coordination and the RAT-specific function of UE can be located before the trigger of the intra-radio handover, and the RAT-specific function can trigger the intra-radio handover after the determined delayed duration. In this case, the coordinator may determine a necessary handover based at least in part on related information on UE. Another alternative implementation is that in this case, the RAT-specific function sends an intra-radio handover message to its related serving BS together with the delay time value, and the serving BS performs the actual delay operation. Anyway, many alternations can be made in order to meet the specific network environment and particular requirements.

From above we can see that the proposed coordination solution solves the problem of service break at UE in multi-radio environment. However, it might be possible that in some extreme cases, the UE is moving so fast that it loses the connection to serving BS right after it receive a HO command indicating a determined delay time value of an intra-radio handover. In this case, because HO command is not delayed, UE will still be able to receive it. But after that, the connection to serving BS is break due to bad link conditions and the postponed delay is failed. If HO execution is delayed in only one radio, i.e., the coordinator ensures there is one active radio on UE by postponing the handover of this radio and HO executions in other radios are as same as conventional case, in this extreme case, service break cannot be avoided as same as in the case without coordination. But at least, service interruption won't become worse because some other radio(s) (that finishes HO execution without intentional delay) will start to deliver traffic for the upper-layer service. In addition, HO triggers in each radio can be carefully designed so that HO can be triggered in time and reduce the happening possibility of such extreme case. For example, adjust the threshold values of intra-radio handovers.

With referencing to those exemplary figures and embodiments, the invention has been explained. Those skilled in the art understand that when an intra-radio handover is performed, traffic on this radio will be carried by other active radios, which is called as inter-system/inter-radio handoff, and such flexible traffic dispatching among different radios are known. Therefore, for conciseness purpose, we omit details on inter-radio handoff.

It is noted that although sometimes only multi-radio or dual-radio is used, in addition to contrary specific emphasis, it refers to the scenario that more than one radio is supported/active/working/available, in other words, throughout the specification and the claims, dual-radio/multi-radio means "more than one radio".

From the above, it is obvious that the invention can be implemented as software, hardware or the combination thereof. The proposed apparatus can be a separate entity, or embodied into other existing device, apparatus, or functional blocks.

Although the exemplary embodiments of the method and apparatus for coordinating the executions of the intra-radio handover have been described, the above embodiments and figures are just specific examples and are not exhaustive. Those skilled in the art can make numerous changes and modifications within the spirit and scope of the present invention. In addition, the sequences of the steps can be adjusted within the spirit of the invention, and the structural configurations of the apparatus can be further combined or divided according to certain requirements. Therefore, the present invention is not limited to those embodiments, the scope of which is defined only by the appended claims.

The invention claimed is:

1. A method comprising:
   determining, by a base station or a communication device, whether to perform an intra-radio handover of an active radio on the communication device; and
   determining, by the base station or the communication device, whether to postpone the intra-radio handover of the active radio based on a handover status of at least one other active radio on the communication device, wherein the determining whether to postpone is determined by a number of simultaneous handovers of active radios on the communication device being in the handover status.

2. The method according to claim 1, wherein if a request of the intra-radio handover is received from the communication device, or a degradation of the communication quality in a radio supported by the communication device is found, the intra-radio handover is performed on the communication device.

3. The method according to claim 1, further comprising transmitting, by the base station or the communication device, a message to perform the intra-radio handover on the communication device.

4. The method according to claim 3, wherein the message indicates at least one of the following: whether to perform the intra-radio handover with a delay, whether to perform the intra-radio handover without a delay, whether to perform the intra-radio handover with a determined delay time duration, and whether to request the intra-radio handover on the communication device.

5. The method according to claim 1, wherein if all other radios on the communication device are active radios in the handover status, or if the number of active radios in the handover status on the communication device is higher than a threshold, or if the number of active radios on the communication device in the handover status is lower than a threshold, then the intra-radio handover is determined to be postponed.

6. The method according to claim 1, wherein if more than one of an intra-radio handover request are determined to be performed on the communication device, then at least one of the intra-radio handovers is selected to be postponed based at least in part on a channel change rate or time consumed by the intra-radio handover.

7. An apparatus comprising
at least one processor; and
at least one memory including computer program code, the at least one processor, the at least one memory, and the computer program code configured to cause the apparatus to at least:
determine whether to perform an intra-radio handover of an active radio on a communication device; and
determine whether to postpone the intra-radio handover of the active radio based on a handover status of at least one other active radio on the communication device, wherein the determine whether to postpone is determined by a number of simultaneous handovers of active radios on the communication device being in the handover status.

8. The apparatus according to claim 7, wherein if a request of the intra-radio handover is received from the communication device, or a degradation of the communication quality in a radio supported by the communication device is found, the intra-radio handover on the communication device is performed.

9. The apparatus according to claim 7, the apparatus further caused to transmit a message to perform the intra-radio handover on the communication device.

10. The apparatus according to claim 9, wherein the message indicates at least one of the following: whether to perform the intra-radio handover with a delay, whether to perform the intra-radio handover without a delay, whether to perform the intra-radio handover with a determined delay time duration, and whether to request the intra-radio handover on the communication device.

11. The apparatus according to claim 7, wherein if all other radios on the communication device are active radios in the handover status, or if the number of active radios in the handover status on the communication device is higher than a threshold, or if the number of active radios on the communication device in the handover status is lower than a threshold, the intra-radio handover is determined to be postponed.

12. The apparatus according to claim 7, wherein if more than one of an intra-radio handover request are determined to be performed on the communication device, then at least one of the intra-radio handovers is selected to be postponed based at least in part on a channel change rate or time consumed by the intra-radio handover.

13. The apparatus according to claim 12, wherein the selection selects the at least one intra-radio handover on a radio with slowest channel change rate or longest time consumed.

14. The apparatus according to claim 12, wherein the channel change rate is based on at least one of a channel quality indicator, a cell size, a signal to noise ratio, a signal to interference plus noise ratio, a signal to noise distortion ratio, a carrier to interference plus noise ratio, and a received signal strength indicator.

15. An apparatus comprising
at least one processor; and
at least one memory including computer program code, the at least one processor, the at least one memory, and the computer program code configured to cause the apparatus to at least:
receive a message to perform an intra-radio handover on an active radio;
perform the intra-radio handover of the active radio according to the received message; and
determine whether to postpone the intra-radio handover of the active radio based on a handover status of at least one other active radio on the apparatus, wherein the determination of whether to postpone is determined by a number of simultaneous handovers of active radios on the apparatus being in the handover status.

16. The apparatus according to claim 15, the apparatus further caused to:
send a request of the intra-radio handover, the request indicating one of the following: whether to perform the intra-radio handover with a delay, whether to perform the intra-radio handover without a delay, whether to perform the intra-radio handover with a determined delay time duration, and whether to request the intra-radio handover on the apparatus; and
determine a delay time duration and perform the intra-radio handover with the determined delay time duration when the request indicates whether to perform the intra-radio handover with a delay,
wherein the apparatus is a mobile station.

17. A method comprising:
receiving, by a communication device, a message to perform an intra-radio handover of an active radio;
performing, by the communication device, the intra-radio handover of the active radio according to the received message; and
determining, by the communication device, whether to postpone the intra-radio handover of the active radio based on a handover status of at least one other active radio on the communication device, wherein the determining whether to postpone is determined by a number of simultaneous handovers of active radios on the communication device being in the handover status.

18. The method according to claim 17, further comprising:
sending, by the communication device, a request of an intra-radio handover, the request indicating one of the following: whether to perform the intra-radio handover with a delay, whether to perform the intra-radio handover without a delay, whether to perform the intra-radio handover with a determined delay time duration, and whether to request the intra-radio handover on the communication device; and
determining, by the communication device, a delay time duration and perform the intra-radio handover with the determined delay time duration when the request indicates whether to perform the intra-radio handover with a delay.

19. A computer program product comprising at least one non-transitory computer-readable medium encoded with instructions that, when executed by at least one processor, perform at least the following:
determining, by a base station or a communication device, whether to perform an intra-radio handover of an active radio on the communication device;
determining, by the base station or a communication device, whether to postpone the intra-radio handover of the active radio based on a handover status of at least one other active radio on the communication device, wherein the determining whether to postpone is determined by a number of simultaneous handovers of active radios on the communication device being in the handover status.

20. A computer program product comprising at least one non-transitory computer-readable medium encoded with instructions that, when executed by at least one processor, perform at least the following:
- receiving, by a communication device, a message to perform an intra-radio handover of an active radio;
- performing, by the communication device, the intra-radio handover according to the received message; and
- determining, by the communication device, whether to postpone the intra-radio handover of the active radio based on a handover status of at least one other active radio on the communication device, wherein the determining whether to postpone is determined by a number of simultaneous handovers of active radios on the communication device being in the handover status.

* * * * *